No. 754,240. PATENTED MAR. 8, 1904.
E. G. RODER.
SELVAGE FORMING ATTACHMENT FOR LOOMS.
APPLICATION FILED APR. 15, 1903.
NO MODEL.
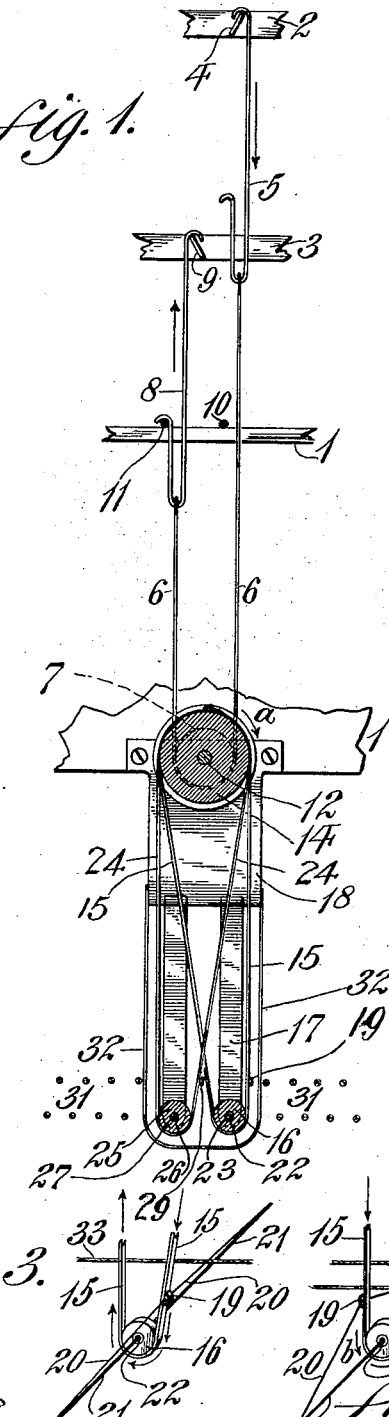
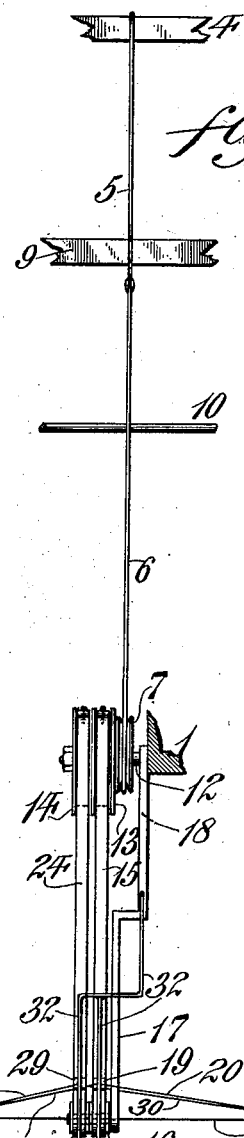
Witnesses
L. Douville
P. F. Nagle
Inventor
Edwin G. Roder
By Wiedersheim & Fairbanks
Attorneys No. 754,240.

Patented March 8, 1904.

UNITED STATES PATENT OFFICE.

EDWIN G. RODER, OF CHESTER, PENNSYLVANIA.

SELVAGE-FORMING ATTACHMENT FOR LOOMS.

SPECIFICATION forming part of Letters Patent No. 754,240, dated March 8, 1904.

Application filed April 15, 1903. Serial No. 152,657. (No model.)

*To all whom it may concern:*

Be it known that I, EDWIN G. RODER, a citizen of the United States, residing at Chester, in the county of Delaware, State of Pennsylvania, have invented a new and useful Improvement in Selvage-Forming Attachments for Looms, of which the following is a specification.

My invention relates to improvements in looms; and it consists of a doup-selvage motion wherein the use of springs is dispensed with, and the several parts of said doup-selvage motion are so constructed that they operate in a positive manner, thereby avoiding the irregular and uncertain movements resulting from the use of springs.

Figure 1 represents a partial front elevation and partial vertical section of a doup-selvage motion embodying my invention. Fig. 2 represents a side elevation of certain of the parts seen in Fig. 1 and at a right angle thereto. Figs. 3 and 4 represent perspective views of certain detached portions of the device. Fig. 5 represents a perspective view of a portion of a woven fabric provided with selvage as produced by my doup-selvage motion.

Similar characters of reference indicate corresponding parts in the figures.

Referring to the drawings, 1 designates a portion of a frame of usual construction and in which are fitted the griffs 2 and 3, to which alternate vertical reciprocating motion is imparted in any well-known manner, it being noted that the griff 2 is provided with a blade 4, from which is suspended a hook 5, to which is secured one end of a cord or its equivalent 6, which is passed around a pulley 7 and has its opposite end secured to a hook 8, which is suspended from a blade 9, carried by the griff 3, it being understood that, if desired, the cord 6 may be passed several times around the pulley 7, so as to prevent said cord 6 from slipping around the pulley 7. The hooks 5 and 8 when in their lowermost positions are supported on the rods 10 and 11, respectively, it being understood that said rods are secured in the frame 1.

The pulley 7 is preferably loosely mounted on the shaft 12, secured in the frame 1. The pulley 7 is secured in any suitable manner to the pulleys 13 and 14, so as to cause the two latter to turn in unison therewith. The pulley 13 has secured thereto a belt 15, which is passed partly around the pulley 16, which is journaled in the depending member or strap 17 of the bracket 18, it being noted that said belt 15 is provided with an eye 19, through which is passed the tying or selvage warp-yarn 20 and that the warp-yarn 21 is passed through an eye 22 in the stud 23, on which said pulley 16 is journaled. The pulley 14 has secured thereto a belt 24, which is passed partly around a pulley 25, journaled on a stud 26, it being noted that said stud 26 is provided with an eye 27, as seen in Fig. 1, and through which is passed the warp-yarn 28, (seen in Fig. 5,) it being further noted that the belt 24 is provided with an eye 29, through which is passed the selvage or tying warp-yarn 30. The eyes 19 and 29 are prevented from coming in contact with the regular warp-yarns 31 by a guard 32, as will be understood from an inspection of Fig. 1.

33 designates the filling or weft yarns.

The operations is as follows: Assuming the parts seen in Figs. 1 and 3 to be in the positions seen in said figures, it is apparent that when the hook 8 is lifted by the blade 9 the blade 4 and the hook 5 descend, whereupon a rotary motion is imparted to the pulleys 13 and 14, causing the latter to turn in the direction indicated by the arrow *a* in Fig. 1. This causes the belts 15 and 24 to move in the direction indicated by the arrows in Fig. 3, whereupon the filling or weft yarn 33, which was drawn through the shed formed by the warps 20 and 21, are secured together by reason of said warp 20 being drawn over a filling-yarn 33 and under the warp 21, after which said warp 20 is lifted on the opposite side of the warp 21 and is brought into the position seen in Fig. 4, thereby producing a subsequent shed through which a following filling or weft 33 is shot, after which the warp 20 is drawn by the eye 19 in the direction indicated by the arrows *b* in Fig. 4, thus causing the warp 20 to return into the position seen in Fig. 3. It is to be understood that the operation as described in connection with the warps 20 and 21 applies likewise to the warps 28 and 30 and that the same is repeated until a sufficient quantity of fabric is woven, after which said fabric may be cut in the direction of the warps and between the selvages formed by the warps 20 and 21 and 28 and 30—that is to say, along the line c d in Fig. 5—it being obvious that several such cuts may be made in the width of the fabric, the same depending upon the number of eyes 19 and 29 employed.

It will be evident that various changes may be made by those skilled in the art which will come within the scope of my invention; and I do not, therefore, desire to be limited in every instance to the exact construction herein shown and described.

Having thus described my invention, what I claim as new, and desire to secure by Letters Patent, is—

1. A doup-selvage motion having means for carrying a selvage warp-yarn, a belt operative to reciprocate said carrying means and loom portions positively and alternatively reciprocating in both directions, the ends of said belt being connected with said loom portions.

2. A doup-selvage motion comprising a belt, an eye in said belt for carrying a warp-yarn, a pulley over which said belt runs, and like positive means for rotating said pulley in both directions.

3. A doup-selvage motion comprising a stud having an eye adapted to carry a selvage warp-yarn, a belt adapted to carry a second selvage warp-yarn, a pulley over which said belt passes and like positive means for rotating said pulley in both directions, whereby said warp-yarns are twisted together to form a selvage.

4. A doup-selvage motion comprising a suitably-supported stationary warp-carrier, a reciprocating warp-carrier attached to a belt, a pulley over which said belt passes and two vertically-reciprocating griffs connected with said pulley, whereby it is positively rotated in both directions.

5. A doup-selvage motion comprising a pulley, like positive means for rotating said pulley in both directions, a belt on said pulley, a second or guide pulley over which said belt runs, a hollow axle adapted to carry a selvage warp-yarn on which said guide-pulley rotates and an eye on said belt adapted to carry a crossing selvage warp-yarn.

6. A doup-selvage motion comprising a pulley, means for rotating said pulley in both directions, a strap bearing a second or guide pulley, a belt running over both of said pulleys, means on said strap adapted to carry a selvage warp-yarn, eyes on said belt for carrying a crossing selvage warp-yarn and a guard adapted to prevent said eyes from contact with the remaining warp-yarns.

7. A doup-selvage motion comprising a belt, means on said belt for carrying a crossing selvage warp-yarn, a pulley over which said belt runs, like positive means for rotating said belt in both directions and stops adapted to positively limit the rotation of said belt in both directions.

EDWIN G. RODER.

Witnesses:
JOHN A. WIEDERSHEIM,
F. S. STANLEY,
S. R. STANLEY.